United States Patent Office 3,310,545
Patented Mar. 21, 1967

3,310,545
PROCESS FOR CURING POLYCHLOROPRENE
Richard Oscar Becker, Wilmington, Del., assignor to E. I. du Pont de Nemours and Company, Wilmington, Del., a corporation of Delaware
No Drawing. Filed Sept. 11, 1963, Ser. No. 308,067
5 Claims. (Cl. 260—92.3)

This invention relates to curing chloroprene polymers with metallic oxides and more particularly to a new curing system which yields cured products of improved heat resistance.

Although the polychloroprene elastomers, when properly compounded and cured, have excellent heat resistance as measured by quantitatively determining the change in properties which takes place on aging at elevated temperatures, still further improvement is desirable.

It is an object of the present invention to provide chloroprene polymer vulcanizates having improved thermal stability and to a process for obtaining these vulcanizates. It is a further object of the present invention to provide a new combination of metal oxides for curing chloroprene polymers to obtain this improved characteristic. Other objects will appear hereinafter.

Conventionally, many chloroprene polymers are cured with a vulcanizing amount of a combination of metal oxides, one of which is usually zinc oxide and the other of which is usually lightly calcined magnesium oxide or lead oxide. It has been found that when calcium oxide is used in place of these "other" metal oxides, on an equivalent basis, and in combination with the zinc oxide, a chloroprene polymer vulcanizate having improved thermal stability is obtained. This improvement, however, is obtained only when the calcium oxide substituted for the conventionally employed "other" oxides is hard burnt lime. Hard burnt lime is calcium oxide prepared by calcining the oxide or partly hydrolyzed calcium oxide or an oxide-yielding compound such as calcium hydroxide or calcium carbonate at high temperatures. Calcium carbonate should be calcined between temperatures of about 1200° F. to about 2100° F. and the other mentioned burnt lime sources should be calcined at temperatures between 800° F. to about 1600° F. The burnt lime is preferably substantially pure calcium oxide obtained by calcining at the temperatures described. The burnt lime product should be made from finely divided calcium compounds which are free of impurities which seem to cause agglomeration of the product during hard burning, examples of such impurities being chlorides and silica. When lightly calcined calcium oxide, which is the kind used in the rubber industry, is employed in place of hard burnt lime, the improved heat resistance for the chloroprene polymer vulcanizate is not obtained.

The amount of zinc oxide employed in combination with hard burnt lime is about 2 to 20 parts by weight per 100 parts of polymer. The amount of hard burnt lime needed to thermally stabilize the vulcanizate will depend on such factors as curing conditions, both temperature and the amount of ZnO present, as well as upon the particular chloroprene polymer being vulcanized. Generally, improved thermal stabilization is obtained, as compared on an equivalent basis to MgO, when about 2 to 20 parts by weight of hard burnt lime is present along with ZnO during the cure per 100 parts by weight of polymer.

This invention is applicable to all types of plastic, curable chloroprene polymers made by polymerization, for example, in the presence of mercaptans or other modifying (chain transfer) agents such as the dialkyl xanthogen disulfides or in the presence of sulfur, followed by plasticizing treatment, or by very limited polymerization without agents followed by removal of the unchanged chloroprene monomer. All these processses are fully described in the prior art. See for example, U.S. Patents 1,950,436; 2,227,517; 2,234,215; and 2,567,117. The mercaptan-modified polymers of U.S. Patents 2,227,517 and 2,567,117 are preferred.

The polymers of chloroprene used include both polychloroprene itself and copolymers of chloroprene with up to an equal weight of other ethylenically unsaturated monomers copolymerizable therewith, such as styrene, acrylic nitrile, methyl methacrylate, isoprene, and 2,3-dichlorobutadiene-1,3. Again, the properties conferred by the comonomers and the methods for using them are well known in the prior art. Likewise materials used with the chloroprene polymers as antioxidants, plasticizers, curing agents, accelerators, reinforcing agents, pigments and extenders are well known, as are the quantities which should be used under various circumstances. This prior art is applicable in the present invention. Two recently discovered agents for controlling the effect of heat and light on cured chloroprene polymer stocks are disclosed in U.S. patent applications Ser. No. 39,758 of P. A. Roussel, filed June 30, 1960, now abandoned, and Ser. No. 25,871 of R. O. Becker, filed May 2, 1960, now abandoned, published as an abbreviature in 811, O.G. 771. These relate respectively to incorporating (1) 1 to 3% of primary aliphatic mercaptans and (2) a mixture of 5 to 40% of fatty acids with 12 to 22 carbon atoms, or their alkyl esters, or glycerides and 0.5 to 5.0% of a non-discoloring antioxidant. The use of these agents along with hard burnt lime is a preferred embodiment of the present invention.

The curing step in the present invention is also carried out as in the prior art, at temperatures of about 200 to 400° F. and preferably 250 to 350° F.

The following examples illustrate the present invention. Parts and percents are by weight unless otherwise noted:

Example 1

Calcium carbonate, of reagent grade, free from chloride and finely powdered, is heated at 1600° F. in a crucible for one hour. A plastic polychloroprene (100 parts by weight), made substantially according to the example in U.S. Patent 2,567,117 referred to above, is compounded with 2 parts of phenyl betanaphthylamine antioxidant, 29 parts of semi-reinforcing furnace black, 5 parts of zinc oxide, 0.5 part of 2-mercaptoimidazoline accelerator and 5.6 parts of the calcium oxide prepared above. The compounding is carried out on a rubber mill, using the ordinary precautions for obtaining a good dispersion of the ingredients. The stock is then cured at 307° F. for 15 minutes in the form of slabs from which suitable test pieces are then cut. For comparison, stocks are prepared and cured containing (in place of the above calcium oxide) 4 parts of magnesium oxide of the lightly calcined type found to be most suitable for use in polychloroprene and manufactured for this purpose. This 4 parts is chemically equivalent to the 5.6 parts of calcium oxide used above. In other words, the magnesium oxide (molecular weight 40) and calcium oxide (molecular weight 56) are used in the ratio of their molecular weights.

The calcium oxide stock embodying the present invention has the same physical properties as this magnesium oxide stock representing the prior art, including modulus (stress) at 300% elongation, tensile strength, elongation at break, rate of cure, hardness, and compression set, measured at 212° F. for 70 hours according to ASTM Method D-395. The calcium oxide stock has the outstanding advantage, however, of improved heat resistance determined quantitatively by comparing the changes in physical properties taking place on aging the cured stocks for 6 days at 250° F. Thus, the calcium oxide stock decreased in tensile strength from 3200 lbs./sq. in. only to 1900 and in elongation at break from 540% only to 260% under these severe aging conditions, while the magnesium oxide control decreased in tensile and elongation from the same original values to 1300 lbs. and 150%, respectively.

A calcium oxide stock containing 5.6 parts of the oxide made by heating a pure, finely divided calcium hydroxide at 1200° F. closely resembles the above calcium oxide stock in original physical properties and heat aging characteristics.

On the other hand, otherwise similar stocks containing various commercial calcium oxides and calcium oxide made from calcium carbonate below 1200° F. and from calcium hydroxide below 800° F. have poorer curing properties, with low modulus and high compression set and age poorly. This is also true when the calcium oxide is made above 1200° F. from a natural carbonate containing silica or from a precipitated carbonate from which chlorides have not been removed.

*Example 2*

Calcium oxide (5.6 parts) made at 1600° F. from pure calcium carbonate as in Example 1 is substituted for the 4 parts of magnesium oxide in the following stock, already designed for improved heat resistance by incorporating a fatty oil and an alkyl mercaptan in accordance with the prior art referred to above. This stock contains:

| | Parts |
|---|---|
| Plastic polychloroprene | 100.0 |
| Stearic acid | 0.5 |
| Reaction product of diphenyl amine and diisobutylene | 4.0 |
| Para(paratolyl sulfonylamido)diphenyl amine | 1.0 |
| Whiting | 90.0 |
| Fast extruding furnace carbon black | 20.0 |
| Magnesium oxide | 4.0 |
| Zinc oxide | 15.0 |
| Dodecyl mercaptan | 1.5 |
| 2-mercaptoimidazoline | 1.0 |
| Rapeseed oil | 15.0 |

Both the calcium oxide and magnesium oxide stocks are cured at 307° F. for 15 minutes. They are identical in modulus (stress) at 100 and 300% elongations, tensile strength, elongation at break, rate of cure, hardness, compression set, and oil swell, determined by immersion for 70 hours at 212° F. in ASTM oil No. 3. On the other hand, the calcium oxide stock embodying the present invention shows much better heat resistance when heated 21 days at 250° F. Thus, its modulus at 100% elongation increases by only 87% and 85% of its elongation at break is retained, as compared with 187% and 52% for the cured magnesium oxide stock above.

As many widely different embodiments of this invention may be made without departing from the spirit and scope thereof, it is to be understood that this invention is not limited to the specific embodiments thereof except as defined in the appended claims.

What is claimed is:

1. A process comprising curing by heating chloroprene polymer in the presence of from 2 to 20 parts by weight of zinc oxide per 100 parts by weight of said polymer and hard burnt lime and obtaining as a result thereof chloroprene polymer vulcanizate having improved heat resistance.

2. A process comprising curing by heating chloroprene polymer in the presence of from 2 to 20 parts of zinc oxide and 2 to 20 parts of hard burnt lime, both per 100 parts by weight of said polymer, and obtaining as a result thereof chloroprene polymer vulcanizate having improved heat resistance.

3. A process comprising curing by heating chloroprene polymer in the presence of (a) from 2 to 20 parts by weight of zinc oxide per 100 parts by weight of said polymer and (b) thermally stabilizing amount of hard burnt, finely divided calcium oxide and obtaining as a result thereof chloroprene polymer vulcanizate having improved heat resistance.

4. In the process of curing by heating chloroprene polymer in the presence of zinc oxide and another metal oxide as curing agents, the improvement comprising carrying out the curing step with hard burnt lime being said other metal oxide.

5. Chloroprene polymer containing as curing agents 2 to 20 parts of zinc oxide and 2 to 20 parts of hard burnt lime, both said parts being by weight per 100 parts by weight of said polymer.

References Cited by the Examiner

UNITED STATES PATENTS 2,540,596   2/1951   Rehner et al. _____ 260—92.3

JOSEPH L. SCHOFER, *Primary Examiner.*

H. I. CANTOR, *Assistant Examiner.*